Jan. 15, 1963  D. P. DOLL ETAL  3,073,711
COMPOSITE PIGMENT
Filed April 4, 1961
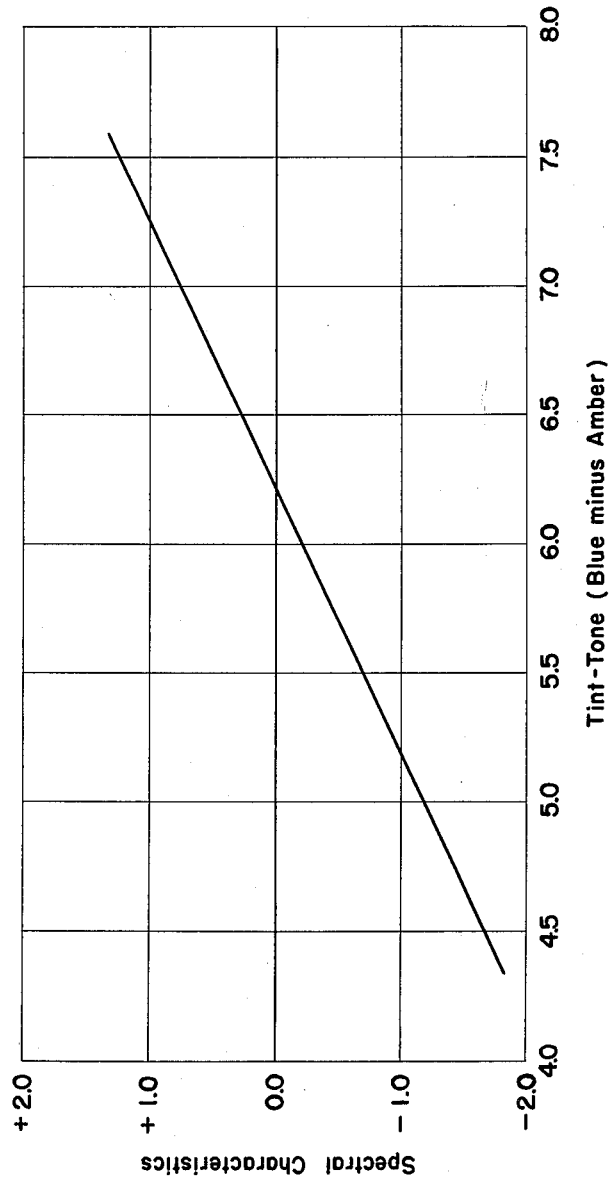
INVENTORS
DONALD P. DOLL
BY HERBERT H. VOLKENING
Robert L. Holiday
AGENT 3,073,711
COMPOSITE PIGMENT
Donald P. Doll, Webster Groves, and Herbert H. Volkening, Affton, Mo., assignors to National Lead Company, New York, N.Y., a corporation of New Jersey
Filed Apr. 4, 1961, Ser. No. 100,594
5 Claims. (Cl. 106—296)

The present invention relates in general to a method for the preparation of composite titanium dioxide-calcium sulfate pigments. More specifically it relates to a process for producing a composite titanium dioxide-calcium sulfate pigment which has a superior color tone in both tinted and white paints.

Many processes have been described in the literature and patents for the production of titanium dioxide-calcium sulfate composite pigments. The early prior art describes methods for producing composite pigments in which the titanium dioxide present in the pigment possesses the anatase crystal structure. Later prior art teaches producing composite pigments in which titanium dioxide possesses the rutile structure. The latter composite pigment possesses superior tinting strength and hiding power over the former type of composite pigment. The present invention contemplates producing a rutile titanium dioxide-calcium sulfate composite pigment which is not only superior in tinting strength and hiding power but in addition possesses decidedly improved color tones in tinted and white paints.

Rutile titanium dioxide pigments normally tend to possess slightly yellowish or grayish undertones which are a disadvantage in preparing white or tinted paints and in some instances care must be exercised in preparing paint formulations so that these undertones do not adversely effect the color tone of the paint produced. It is, therefore, desirable to produce a rutile titanium dioxide-calcium sulfate composite pigment which possesses a superior color tone, i.e. does not possess the undesirable undertones which have heretofore impaired the color of tinted and white paints in which they are used.

An object of the instant invention is to provide a method for producing a rutile titanium dioxide-calcium sulfate composite pigment possessing a superior color tone which is not detrimental to the color of tinted or white paint. A further object is to provide a process for producing composite pigments which possess superior color tones as well as possessing high quality pigment standards in all other aspects. These and other objects will become apparent from the following more complete description of the instant invention.

Prior to the instant invention rutile titanium dioxide-calcium sulfate composite pigments of good quality were made by a variety of methods which are described in detail in the prior art. The instant invention provides a process which covers an improvement over one of the prior basic processes. The basic process involved in the instant invention may be described briefly as follows:

Ilmenite ore is finely ground and digested in concentrated sulfuric acid to form a titanium sulfate solution. The solution is then clarified and has a titanium concentration of about 5 to 10 pounds per cubic foot of solution, calculated as $TiO_2$.

A slurry of anhydrite is prepared by reacting lime, limestone or gypsum with sulfuric acid and adjusting with water so that the slurry is about 15 to 40% anhydrite.

The titanium solution is then admixed with the anhydrite slurry and the mixture is heated to boiling to hydrolyze the titanium values in the presence of the anhydrite. This particular type of hydrolysis product is known in the art as a "coprecipitated" titanium hydrate. This hydrate is then washed, dewatered and calcined to produce the titanium dioxide-calcium sulfate composite pigment. Composite pigments contemplated by the instant invention contain from 25% to 75% titanium dioxide, the remainder being anhydrite.

The instant invention contemplates the following process which comprises preparing an anhydrite aqueous slurry in which the particle size of the anhydrite is from $0.3\mu$ to $0.7\mu$, admixing a titanium sulfate solution with said slurry and heating the mixture to boiling to hydrolyze the titanium values from said titanium solution to form a "coprecipitated" hydrate; adding to said coprecipitated hydrate a titanium sol and zinc, the amount of said sol being from 0.3% to 5.0% and the amount of said zinc, calculated as ZnO, being from 0.5% to 2.0%, both of which are based on the weight of the $TiO_2$ in said hydrate and calcining the treated hydrate until at least 90%, preferably 95%, of the titanium values in the calcined product has the crystal structure of rutile but insufficient to develop undertones that could degrade the color tone in tinted and white paints.

It has been found that all of these factors are necessary to produce the superior type of pigment produced by the instant invention. In order to explain the instant invention more fully a more detailed description of the instant invention is presented.

It has been found that it is necessary to employ an anhydrite having an average particle size of $0.3\mu$ to $0.7\mu$.

In order to determine the particle size of the anhydrite produced in the instant invention, a method and an apparatus was employed which is similar to the ones described by C. L. Gooden and C. M. Smith in their publication in Ind. Eng. Chem., Anal. Ed. 12, 479 (1940).

Anhydrite possessing this small particle size may be prepared by a variety of methods provided sufficient precautions are taken regarding the particle size of the lime, limestone or gypsum employed, the concentration of the acid used, the type of slurry used, the rate of addition and the heating cycle employed. One particularly successful method for producing the small size anhydrite necessary for the instant invention is that described in detail in U.S. Patent No. 2,956,859, issued October 18, 1960, to Warren Rodgers et al., and assigned to the same assignee as the instant invention. In the Rodgers et al. patent the anhydrite is prepared by first forming an anhydrite seed by adding a minor portion of gypsum to 74% to 80% $H_2SO_4$ at a temperature from 20° C. to 70° C., said gypsum added at a rate of from 0.0125 to 1.0 part gypsum per minute for each part of acid. The remaining gypsum is added to the anhydrite seed and the mixture is heated from 80° C. to boiling to convert all of the gypsum to anhydrite. Anhydrite prepared in this manner will have an average particle size from $0.3\mu$ to $0.7\mu$.

The titanium solution is then admixed with a slurry of 15 to 40% anhydrite produced as described above, and the mixture is heated to boiling to hydrolyze the titanium values in the presence of the anhydrite to form the "coprecipitated" titanium hydrate.

The titanium hydrate thus produced is then deliquored, washed and bleached in the usual manner. To the washed hydrate are added from 0.3% to 5.0% of a titanium sol and from 0.5% to 2.0% zinc, calculated as zinc oxide, both percentages based on the weight of the titanium dioxide in said hydrate.

The titanium sol added as a treating agent to the titanium hydrate may be defined as a semi-colloidal titanium material consisting of acicular crystals ranging in particle size from 50 to 1500 A. and having a crystal structure of at least 15% rutile. This type of titanium sol may be prepared by a variety of known methods, as for example, by heat treating a hydrous titanium oxide or an alkali metal titanate with a monobasic acid to convert the titanium values to the colloidal state.

It has been found that it is necessary to add from 0.3% to 5.0% of the titanium sol to the titanium hydrate. Amounts below 0.3% are unsatisfactory while amounts above 5.0% do not produce pigments having superior properties over those obtained when using amounts which lie within the specified range. It is preferred for economic reasons to add from 1.0% to 3.0%. All of the percentages are based on the weight of the titanium dioxide in the titanium hydrate.

In addition to adding the titanium sol, it is necessary to also employ zinc or zinc compound to the titanium hydrate. Either metallic zinc or any compound of zinc which, upon calcination in the presence of the titanium hydrate produces zinc titanate or zinc oxide, is satisfactory. Among the zinc compounds which may be successfully employed are zinc oxide, zinc hydroxide, zinc sulfate, zinc halides, organo-zinc compounds and the like. The amount of zinc or zinc compounds which is added to the titanium hydrate is from 0.5% to 2.0% zinc, calculated as zinc oxide. For most efficient results amounts from 0.75% to 1.5% are preferred. The percentages are based on the weight of the titanium dioxide present in the titanium hydrate.

After the titanium sol and the zinc are added as treating agents, the treated titanium hydrate is then calcined at elevated temperatures until at least 90% of the titanium dioxide in the pigment has the crystal structure of rutile. It is preferred, however, to calcine the material until 95% rutile is obtained. The calcination of the titanium hydrate is critical in that it is necessary to provide sufficient heat to obtain 90%, preferably 95%, rutile structure but insufficient to degrade the color tone in either white or tinted paints. In order to produce 90% rutile, it has been found that the temperature range of calcination is very limited, i.e. a temperature range between 840° C. and 950° C. preferably 870° C. to 930° C.

With respect to the time of calcination at these temperatures, it is necessary to determine experimentally the time required for each type of equipment used. In most cases, however, the time required within this range is from ½ hour to 6 hours, the higher temperatures obviously requiring less time than the lower temperatures. In any event the color tone falls off rapidly when heated beyond the optimum calcination conditions, so it is necessary to terminate the calcination as soon as the desired rutile percentage is obtained, i.e. before degradation of the color tone takes place.

The calcined titanium dioxide-calcium sulfate composite pigments produced by the instant invention are analyzed to determine the following properties:

Percent rutile
Color brightness in alkyd vehicle
Color tone in alkyl vehicle
Tinting strength
Spectral characteristic in paint vehicles The percentage of rutile was determined by X-ray diffraction and the tinting strength was determined by the well-known Reynolds' Tinting Strength Method as described in Physical and Chemical Examination of Paints, Varnishes, Lacquers and Colors, by H. A. Gardner, ninth edition, May 1939, page 37.

The color brightness, color tone and spectral characteristics were determined by the following tests:

COLOR BRIGHTNESS AND TONE OF PIGMENT IN ALKYD VEHICLE

This test determines instrumentally the brightness and tone of the titanium dioxide-calcium sulfate composite pigment in a wet film of alkyd vehicle. The pigment is dispersed in an alkyd vehicle and the green, red and blue reflectance values of the wet film are measured. The green reflectance value is taken as a measurement of the brightness of the pigment and the blue minus red reflectance value as a measure of the color tone. The determination is made on a Colormaster differential colorimeter manufactured by Manufacturers Engineering and Equipment Corp., Hatboro, Pa.

The pigment was mixed with an alkyd vehicle to form a paste and the paste was applied to the surface of a high reflectance white ceramic panel, the thickness of the paste film being sufficient to eliminate the background color. The green, red and blue reflectance values of the film were read on the Colormaster and the reflectances were recorded as percent reflectance.

It has been found that the color brightness values of the composite pigments produced by the instant invention are at least 93.0% while comparable composite pigments made by prior art methods possess lower color brightness percentages. Color tones of less than −9.0 are obtained on composite pigments of the instant invention while comparable prior art pigments possess higher negative values.

SPECTRAL CHARACTERISTICS OF THE PIGMENTS IN PAINT VEHICLE

This test determines the spectral characteristics or tint tone of the composite pigment in paint vehicles.

6.0 grams of the composite pigment are mixed with 1.524 grams of a diluted lampblack, the preparation of which is described below. 3 ml. of No. 35 general purpose linseed oil and 3 drops of dicoco dimethylammonium chloride are added to the mixture. The ingredients are mulled to form a uniform paste. The paste is then spread upon a glazed cardboard as a thick film, the thickness being sufficient to eliminate the color of the background. The sample is then placed on a Hunter multipurpose reflectometer and the blue and amber reflectance values are separately measured and recorded as percent reflectance.

The amber value is substracted from the blue value and the number obtained is recorded as the tint-tone value. The spectral characteristic is obtained by using the plot, shown in the drawing, tint-tone versus spectral characteristic. The spectral characteristics of composite pigments produced by the instant invention are usually greater than +0.3 while comparable pigments produced by prior art processes possess lower values.

The diluted lampblack above is prepared by blending thoroughly in a ball mill 5 grams of lampblack and 195 grams of calcium carbonate.

In order to further illustrate the instant invention, the following examples are presented:

Example 1

PREPARATION OF THE TITANIUM SULFATE SOLUTION

An ilmenite ore concentrate containing 33.5% FeO, 6.0% $Fe_2O_3$ and 48.4% $TiO_2$ was ground to substantially 325 mesh. The ground ore was then admixed with 66° Bé. $H_2SO_4$. Water was then added to reduce the acid concentration to 88% and to set off the reaction. The ore and acid reacted rapidly to form a digestion cake which was then dissolved in weak acid. Scrap iron was added during the dissolving operation to reduce the ferric iron values to the ferrous state. This dissolved cake formed a solution which was clarified by settling. The clarified solution had the following analysis:

| | |
|---|---|
| Specific gravity at 55° C | 1.531 |
| Percent $TiO_2$ | 8.9 |
| Acid/$TiO_2$ ratio | 2.12 |
| $FeSO_4$/$TiO_2$ ratio | 2.10 |

PREPARATION OF THE ANHYDRITE

High quality limestone (99.0% $CaCO_3$) was ground and classified to an average particle size of 2.26 microns. The ground limestone was reacted with sulfuric acid to form a gypsum slurry. The anhydrite was prepared by spraying 15% of the slurry into 60° Bé. $H_2SO_4$ at 40° C. and the remainder of the gypsum slurry was added near the bottom of the tank. After the first 15% of the slurry was added, steaming was started to preheat the gypsum slurry. The total addition time was 60 minutes. The anhydrite formed upon steaming and the anhydrite produced had an average particle size of 0.55 micron.

PRODUCING A COPRECIPITATED HYDRATE BY PRECIPITATION OF THE TITANIUM HYDRATE IN THE PRESENCE OF THE ANHYDRITE 23,800 pounds of the anhydrite produced above which contained 32% solids were repulped with 890 cu. ft. of the titanium sulfate solution a nucleating solution (or yield seed) was added to the mixture. The nucleating solution was prepared by adding 600 cu. ft. of the titanium sulfate solution to 190 cu. ft. of boiling water. 260 cu. ft. of this nucleating solution were added to the titanium sulfate-anhydrite solution. 1070 cu. ft. of titanium sulfate solution were then added to the mixture and the mixture was boiled for one hour. An additional 800 cu. ft. of the titanium solution were added and the mixture was boiled for an additional 2½ hours. The coprecipitate, consisting of a mixture of titanium hydrate and anhydrite, was filtered, bleached and washed well with water to remove the free acid and various impurities.

PREPARATION OF A TITANIUM SOL

A titanium tetrachloride solution equivalent to 100 g.p.l. $TiO_2$ was added simultaneously with 100 g.p.l. sodium hydroxide solution into a vessel with vigorous agitation. The pH of the mixture was maintained between 6 and 7. Through an outlet in the bottom of the vessel, the reaction product was withdrawn continuously at an average rate of 170 ml. per minute at 45° C. temperature. The slurry was filtered and washed thoroughly to remove the soluble chlorides. The washed filter cake was repulped, diluted to 40 g.p.l. $TiO_2$, charged into a vessel equipped with a reflux condenser, heated to 85° C. at the rate of 1° C. per minute and cured at 85° C. for 30 minutes in the presence of hydrochloric acid which was added to the vessel. The amount of HCl used was sufficient to obtain an $HCl/TiO_2$ ratio of 0.3. The titanium sol was formed during the curing operation and, after heating, was quenched immediately in a cold water bath. A thin, translucent titanium sol was obtained having the following analysis:

| | |
|---|---|
| $TiO_2$ (g.p.l.) | 39.7 |
| HCl (g.p.l.) | 11.5 |
| $HCl/TiO_2$ ratio | 0.29 |
| Rutile (percent) | 20 |
| Particle size (A.) | 50–900 |

PREPARATION OF A $TiO_2$ CALCIUM SULFATE COMPOSITE PIGMENT CONTAINING 50% $TiO_2$ TREATED WITH THE COMBINATION OF A Ti SOL AND Zn

A thoroughly washed and bleached coprecipitated anhydrite-titanium hydrate slurry containing 40% solids was treated with 1.0% ZnO and 2.0% titanium sol, the precentages based on the weight of the $TiO_2$ in the slurry. 5.0% $CaCO_3$ and 0.05% $Sb_2O_3$ were also added as conditioning agents. These latter two additions are not necessary, however, they do tend to improve other properties of the finished pigment.

The treated pigment material was the calcined at 930° C. until 95% of the $TiO_2$ in the pigment possessed a rutile structure.

The calcined pigment was then steam milled and the milled pigment product had the following analysis:

| | |
|---|---|
| Tinting strength | 995 |
| Rutile (percent) | 95 |
| Color brightness | 93.4 |
| Color tone | −8.4 |

*Example 2*

The procedure described in Example 1 for producing a composite $TiO_2$ pigment was repeated except the particular sol described below was used instead of the sol employed in Example 1. The sol of Example 2 was prepared as follows:

A titanium tetrachloride solution equivalent to 100 g.p.l. $TiO_2$ was added in 20 minutes with vigorous agitation to 100 g.p.l. sodium hydroxide solution. The amount of sodium hydroxide used was sufficient to give a final $HCl/TiO_2$ ratio of 0.35. After adding the titanium tetrachloride solution, the slurry obtained was heated under reflux conditions at the rate of 1° C. per minute until the temperature reached 85° C. The slurry was then cured at 85° C. for 30 minutes to form the titanium sol. The sol was then quickly quenched in a cold water bath. The titanium sol formed had the following analysis:

| | |
|---|---|
| $TiO_2$ (g.p.l.) | 37.7 |
| HCl (g.p.l.) | 14.3 |
| $HCl/TiO_2$ ratio | 0.38 |
| Rutile (percent) | 90–100 |
| Particle size (A.) | 100–900 |

The procedure of Example 1 was repeated using the above described sol and the technique employed in Example 1, but with a calcination temperature of 910° C.

The composite pigment produced had the following analysis:

| | |
|---|---|
| Tinting strength | 1000 |
| Rutile (percent) | 98 |
| Color brightness | 93.8 |
| Color tone | −7.8 |
| Spectral characteristics | +0.5 |

*Example 3*

Again the same procedure used in Example 1 was repeated except in this instance the calcination temperature was 910° C. and still another type of sol was employed which was prepared by heat treating sodium titanate with hydrochloric acid to convert the titanium values to the colloidal state in a manner well known in the art to produce a sol having the physical characteristic of the sols previously described.

Using this sol and the procedure described in Example 1 an improved titanium dioxide-calcium sulfate composite pigment was produced having the following analysis:

| | |
|---|---|
| Tinting strength | 990 |
| Rutile, percent | 98 |
| Spectral characteristics | +0.5 |
| Color brightness | 93.8 |
| Color tone | −7.7 |

*Examples 4–5*

In order to show more clearly the superiority of the process of the instant invention, two control runs were made in which ZnO and a titanium sol were added singly as treating agents, not in combination with one another. The pigments were processed in the same manner as that described above. The amounts of ZnO and titanium sol added singly were the same as that used in Example 3. The operational details and the results obtained are recorded in Table 1 along with the results of Example 3.

TABLE 1

| Example No | 3 | 4 | 5 |
|---|---|---|---|
| Amount of ZnO Used (Percent) | 1.0 | 1.0 | none |
| Amount of Titanium Sol Used (Percent) | 2.0 | none | 2.0 |
| Calcination Temperature (° C.) | 910 | 950 | 1025 |
| Rutile (Percent) | 98 | 83 | 93 |
| Tinting Strength | 990 | 955 | 930 |
| Spectral characteristics | +0.5 | −0.2 | +0.2 |
| Color Brightness | 93.8 | 93.7 | 92.6 |
| Color Tone | −7.7 | −8.2 | −9.1 |

From the above data, it has clearly been shown that the tinting strength, the spectral characteristic and the brightness are all improved using the combination of titanium sol and Zn as precalcination treatments over the results obtained using either Zn or sol alone.

It should be noted that the use of Zn alone produces a pigment having an inferior spectral characteristic even though the sample was only calcined to produce 83% rutile conversion instead of the required 90%. At 90% rutile conversion, this Zn treated pigment would possess even a still greater negative spectral characteristic value. The use of the titanium sol alone produced a pigment with inferior brightness and spectral characteristic.

*Examples 6–11*

The procedure of Example 3 was repeated in Examples 6–10 using the same sol, except that the amount of titanium sol employed was varied from 0.5% to 5.0% and the calcination temperatures were varied from 870° C. to 900° C. A control using no sol was also run (Example 11) for comparative purposes. In all cases 1.0% ZnO was used in conjunction with the titanium sol. The operational details and results obtained are recorded in Table II.

TABLE II

| Example No. | 6 | 7 | 8 | 9 | 10 | 11 |
|---|---|---|---|---|---|---|
| Percent Sol Added | 5.0 | 0.5 | 1.0 | 2.0 | 3.0 | 0.0 |
| Percent Rutile | 92 | 97 | 94 | 96 | 95 | 92 |
| Cal. Temp., °C | 890 | 900 | 900 | 890 | 870 | 975 |
| Tinting Strength | 950 | 960 | 940 | 950 | 960 | 960 |
| Spec. Char. | +0.6 | +0.5 | +0.4 | +0.6 | +0.6 | −0.5 |
| Color Brightness | 93.0 | 94.0 | 93.8 | 94.0 | 93.6 | 94.1 |
| Color Tone | −9.1 | −8.5 | −8.0 | −8.7 | −8.8 | −8.7 |

From the above data it has been shown that a superior type of pigment is produced when small amounts of a titanium sol are employed. Amounts of 1% to 3% are preferred since larger amounts do not seem to improve further the pigment quality. From Example 11, the control run in which no sol was employed, it is clearly shown that the spectral characteristics of the control pigments are vastly inferior to all of the pigments which were produced using various amounts of sol as precalcination treatment.

From the above description and by the examples presented, it has clearly been shown that a superior type of titanium dioxide-calcium sulfate composite pigment may be prepared by using the process of the instant invention. The composite pigment of the instant invention contains at least 90% of its titanium dioxide in the rutile crystal form and it possesses the combination of high tinting strength and good spectral characteristics, color and tone in both tinted and white paints. Such a combination of properties is not found in pigments produced by the prior art methods.

While this invention has been described and illustrated by the examples shown, it is not intended to be strictly limited thereto, and other variations and modifications may be employed within the scope of the following claims.

We claim:

1. Method for preparing an improved titanium dioxide-calcium sulfate composite pigment which comprises forming an anhydrite aqueous slurry in which the particle size of the anhydrite is from $0.3\mu$ to $0.7\mu$, admixing a titanium sulfate solution with said slurry and heating the mixture to boiling to hydrolyze the titanium values from said titanium solution to form a "coprecipitated" hydrate, adding to said hydrate a titanium sol and zinc, said sol being a semi-colloidal titanium material consisting of acicular crystals ranging in particle size from 50 to 1500 A. and having a crystal structure of at least 15% rutile, the amount of said sol being from 0.3% to 5.0% and the amount of said zinc being sufficient to yield upon calcination from 0.5% to 2.0% zinc oxide, both of which are based on the weight of the titanium dioxide in said hydrate and calcining the treated hydrate at a temperature between 840° C. and 950° C. until at least 90% of the titanium values in the calcined product has the crystal structure of rutile but insufficient to degrade the color tone in tinted and white paints.

2. Process according to claim 1 in which the treated hydrate is calcined until 95% of the titanium dioxide present in the product has the crystal form of rutile.

3. Process according to claim 1 in which the amount of titanium sol employed is from 1.0% to 3.0%.

4. Process according to claim 1 in which the amount of zinc employed is from 0.75% to 1.5%.

5. Process according to claim 1 in which the treated hydrate is calcined between 870° C. and 930° C.

References Cited in the file of this patent

UNITED STATES PATENTS

| 2,326,157 | McCord et al. | Aug. 10, 1943 |
| 2,444,238 | Aagaard et al. | June 29, 1948 |
| 2,549,261 | Sullivan | Apr. 17, 1951 |
| 2,760,880 | Grave | Aug. 28, 1956 |